(12) United States Patent
Zhu

(10) Patent No.: US 12,353,677 B2
(45) Date of Patent: Jul. 8, 2025

(54) APPLICATION ICON DISPLAY METHOD AND APPARATUS, AND ELECTRONIC DEVICE

(71) Applicant: VIVO MOBILE COMMUNICATION CO., LTD., Guangdong (CN)

(72) Inventor: Weijian Zhu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/605,180

(22) Filed: Mar. 14, 2024

(65) Prior Publication Data
US 2024/0220072 A1    Jul. 4, 2024

Related U.S. Application Data

(63) Continuation of application No. PCT/CN2022/120145, filed on Sep. 21, 2022.

(30) Foreign Application Priority Data

Sep. 24, 2021   (CN) .......................... 202111120914.8

(51) Int. Cl.
   *G06F 3/04817*   (2022.01)
(52) U.S. Cl.
   CPC .............................. *G06F 3/04817* (2013.01)
(58) Field of Classification Search
   CPC ................................................... G06F 3/04883
   See application file for complete search history.

(56) References Cited

U.S. PATENT DOCUMENTS

| | | | | |
|---|---|---|---|---|
| 2012/0030567 A1* | 2/2012 | Victor | ................... | G06F 3/0482 |
| | | | | 715/702 |
| 2012/0147057 A1* | 6/2012 | Lee | ...................... | G06F 3/04817 |
| | | | | 345/173 |
| 2012/0188177 A1* | 7/2012 | Kim | ...................... | G06F 3/0485 |
| | | | | 345/173 |
| 2016/0124630 A1* | 5/2016 | Qian | ...................... | G06F 3/018 |
| | | | | 345/173 |
| 2018/0352426 A1* | 12/2018 | Kowalczykowski | ... | H04L 67/51 |
| 2022/0129139 A1* | 4/2022 | Choi | ....................... | G06F 1/163 |

FOREIGN PATENT DOCUMENTS

| | | |
|---|---|---|
| CN | 106445279 A | 2/2017 |
| CN | 106990884 A | 7/2017 |
| CN | 110968228 A | 4/2020 |
| CN | 112181570 A | 1/2021 |
| CN | 112764630 A | 5/2021 |
| CN | 113805754 A | 12/2021 |

OTHER PUBLICATIONS

Introduction to iOS14App Resource Library Features, https://m.kafan.cn/edu/29241121.html, Sep. 4, 2020.

* cited by examiner

*Primary Examiner* — Nan-Ying Yang
(74) *Attorney, Agent, or Firm* — Price Heneveld LLP

(57) ABSTRACT

This application discloses an application icon display method and apparatus, and an electronic device. The method includes: receiving a first input; and displaying application icons of applications included in a plurality of groups in response to the first input, where the plurality of groups are obtained by classifying a plurality of applications installed in an electronic device, and each group includes at least one application.

17 Claims, 6 Drawing Sheets

APPLICATION ICON DISPLAY METHOD AND APPARATUS, AND ELECTRONIC DEVICE

CROSS-REFERENCE TO RELATED APPLICATIONS

This application is a Bypass Continuation Application of PCT International Application No. PCT/CN2022/120145 filed on Sep. 21, 2022, which claims the priority of Chinese Patent Application No. 202111120914.8 filed on Sep. 24, 2021, which are incorporated herein by reference in their entireties.

TECHNICAL FIELD

This application relates to the field of display technologies, and specifically, to an application icon display method and apparatus, and an electronic device.

BACKGROUND

With larger storage capacity and higher performance of electronic devices, more and more applications are installed in an electronic device. A desktop of an electronic device is a bridge between a user and an application. An application is generally displayed in manners such as desktop pages and application library drawers.

In common grid layout alphabetical sorting, to search for an application through an alphabetical index, the user needs to remember a name of the application, causing low searching efficiency.

SUMMARY

According to a first aspect, an embodiment of this application provides an application icon display method. The method includes:
  receiving a first input; and
  displaying application icons of applications included in a plurality of groups in response to the first input, where the plurality of groups are obtained by classifying a plurality of applications installed in an electronic device, and each group includes at least one application.

According to a second aspect, an embodiment of this application provides an application icon display apparatus, including:
  a first receiving module, configured to receive a first input; and
  a first display module, configured to display application icons of applications included in a plurality of groups in response to the first input, where the plurality of groups are obtained by classifying a plurality of applications installed in an electronic device, and each group includes at least one application.

According to a third aspect, an embodiment of this application provides an electronic device. The electronic device includes a processor, a memory, and a program or instructions stored in the memory and executable on the processor. The program or the instructions, when executed by the processor, implement steps of the method according to the first aspect.

According to a fourth aspect, an embodiment of this application provides a readable storage medium. The readable storage medium stores a program or instructions, and the program or the instructions, when executed by a processor, implement steps of the method according to the first aspect.

According to a fifth aspect, an embodiment of this application provides a chip. The chip includes a processor and a communication interface. The communication interface is coupled to the processor, and the processor is configured to execute a program or instructions, to implement steps of the method according to the first aspect.

According to a sixth aspect, an embodiment of this application provides a computer program product. The computer program product is stored in a non-volatile storage medium. The program product is executed by at least one processor to implement steps of the method according to the first aspect.

According to a seventh aspect, an embodiment of this application provides an electronic device. The electronic device is configured to perform steps of the method according to the first aspect.

DETAILED DESCRIPTION

The following clearly describes the technical solutions in embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

In the specification and claims of this application, terms "first", "second", and the like are used to distinguish similar objects, but are unnecessarily used to describe a specific sequence or order. It should be understood that the terms used in such a way is interchangeable in proper circumstances, so that the embodiments of this application can be implemented in other sequences than the sequence illustrated or described herein. Objects distinguished by "first" and "second" are usually of one type, and a number of objects is not limited, for example, there may be one or more objects. In addition, "and/or" in the specification and claims indicates at least one of connected objects, and a character "/" generally indicates that connected objects are in an "or" relationship.

An application icon display method provided in the embodiments of this application is described below in detail through specific embodiments and application scenarios thereof with reference to the accompanying drawings.

Figure 1:
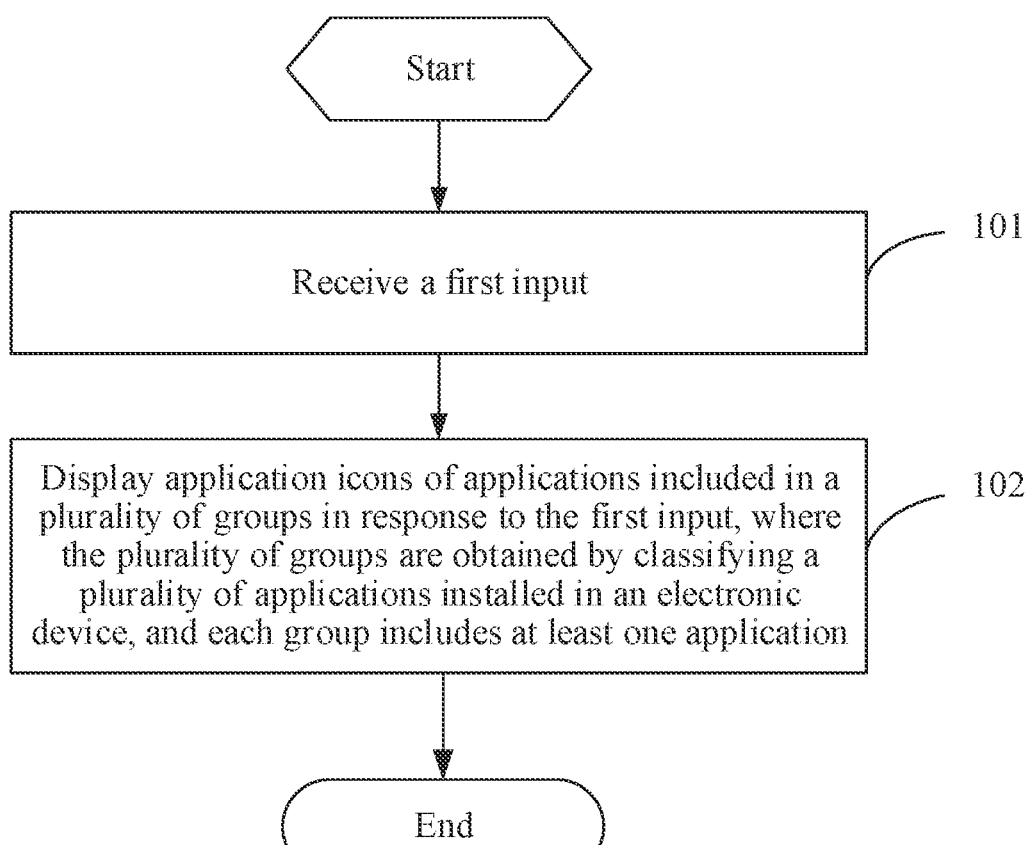
FIG. 1 is a flowchart of an application icon display method according to an embodiment of this application.

FIG. 1 is a flowchart of an application icon display method according to an embodiment of this application. As shown in FIG. 1, the application icon display method provided in this embodiment may be performed by an electronic device, and includes the following steps:

Step 101: Receive a first input.

The first input may be an input of displaying a desktop of the electronic device, for example, an unlocking input, a screen-on input, an input of closing a current interface, or a voice input. Based on the first input, the electronic device may display the desktop.

Step 102: Display application icons of applications included in a plurality of groups in response to the first input, where the plurality of groups are obtained by classifying a plurality of applications installed in the electronic device, and each group includes at least one application.

Specifically, when the applications are classified, the applications may be classified according to functions of the applications, for example, social applications as a category, stock trading applications as a category, office applications as a category, and audio and video entertainment applications as a category.

Alternatively, the applications may be reclassified according to sub-categories of an application store. For example, video playback and music radio applications are classified into an audio and video entertainment category, and there are also information and reading, photography and beauty pictures, communication and social networking, life and travel, payment and shopping, education and learning, games, and other categories. A large category is more inclusive and avoids ambiguity when displaying applications with too many categories.

In this embodiment, the electronic device receives the first input; and displays the application icons of applications included in the plurality of groups in response to the first input, where the plurality of groups are obtained by classifying the plurality of applications installed in the electronic device, and each group includes at least one application. In the foregoing manner, application icons of a plurality of applications may be displayed in groups, and when searching for an application, a user may search in a group corresponding to the application, and can quickly locate the application that the user needs to open, improving searching efficiency.

Further, each of the plurality of groups has a group display sequence; and the group display sequence is determined according to a sum of use frequency of all applications in each group in descending order.

Specifically, the groups may be sorted according to total use frequency of all applications in each group. For example, the audio and video entertainment category (or an audio and video entertainment group) includes a video playback application and a radio application, and use frequency of the video playback application and the radio application is 10 times; and the payment and shopping category (or a payment and shopping group) includes a shopping application 1 and a shopping application 2, and use frequency of the shopping application 1 and the shopping application 2 is 8 times. Therefore, the audio and video entertainment category is sorted before the payment and shopping category.

Use frequency of an application may be updated in real time. For example, when it is detected that use frequency of an application changes, the use frequency of the application is updated. When the desktop of the electronic device is refreshed, latest use frequency of each application may be obtained, and total frequency of a group is determined according to the latest use frequency, where the total frequency of the group is a sum of use frequency of applications in the group. In addition, use frequency may alternatively be updated periodically, for example, updated every 5 minutes, or updated every 10 minutes. The user may set update frequency to reduce power consumption of the electronic device.

Figure 2A:
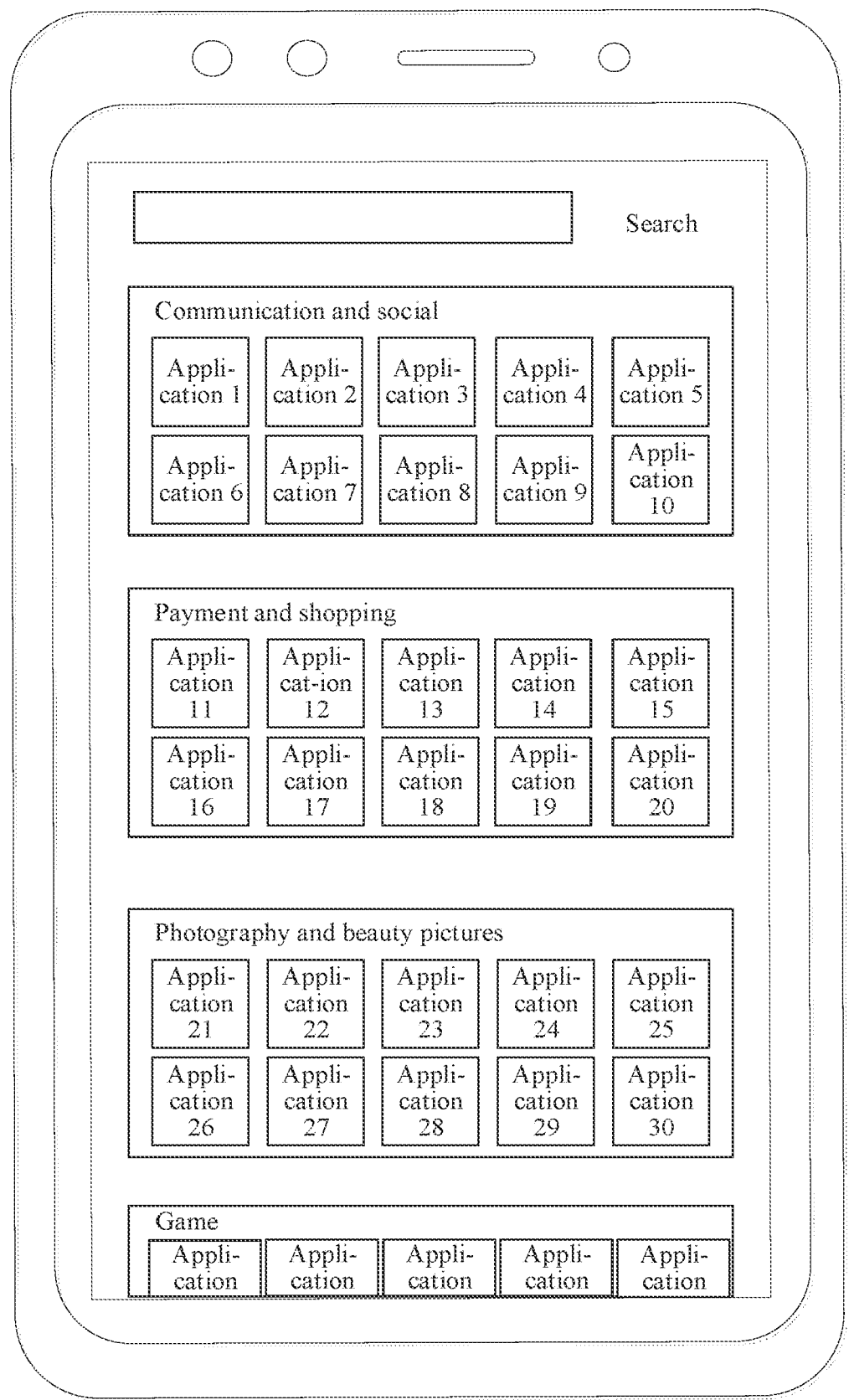
FIG. 2a to FIG. 2c are schematic diagrams of display of a desktop according to an embodiment of this application.

When the electronic device displays the plurality of groups, the plurality of groups are displayed on the desktop of the electronic device according to the group display sequence, for example, displayed on the desktop from left to right or from top to bottom according to the group display sequence. A group with a larger sum of use frequency of all applications is displayed at a higher position, making it easier for the user to view, improving the searching efficiency. Further, if the plurality of groups cannot be displayed on the desktop at the same time, a group not displayed on the desktop may be moved onto the desktop for display through a sliding input. As shown in FIG. 2*a*, a game group in the figure is not completely displayed, and the user may slide the desktop upward to completely display icons of the game group.

In a display region of each group, application icons of applications included in the group are displayed. A minimum display region and a maximum display region may be set for the group. For example, the minimum display region includes a display region of one application icon, and the maximum display region includes a display region of ten icons. If the application icons of the applications included in the group are incompletely displayed in the maximum display region, the application icons are displayed in a folded manner, that is, the application icons that cannot be displayed in the maximum display region are not displayed on a current desktop. Further, the application icons displayed in the folded manner may be displayed in an unfolded manner based on a second input performed by the user, that is, all the application icons in the group are displayed on the current desktop.

Based on the above, the group display sequence is determined according to the sum of the use frequency of all the applications in the group, so that a group with a largest sum of use frequency is displayed first, and the user can easily find a commonly used application, improving application searching efficiency.

Based on the above, the displaying application icons of applications included in a plurality of groups in response to the first input includes:

displaying application icons of target applications included in the plurality of groups on a desktop of the electronic device according to the group display sequence and an icon display sequence of each group in response to the first input, where the icon display sequence is determined according to intra-group information of the group.

Specifically, the target application may be understood as an application that is of the group and displayed on the desktop, and the target application may include one or more applications. A number of target applications may be a preset value, and the preset value may be determined based on a user input, and is not limited herein. For example, if the number of target applications is 8, the target applications of the group are eight applications sorted first in the group. In a display region of each group, application icons of applications included in the group are displayed. A minimum display region and a maximum display region may be set for the group. A size of the display region of the group may also be determined based on a user input. The minimum display region includes a display region of one application icon, and a number of application icons included in the maximum display region may be a preset value, that is, an application icon displayed in the maximum display region is an icon of the target application.

In a case that the group includes a plurality of applications, a display sequence of the plurality of applications also needs to be determined. In other words, display of an application icon is not only related to a sequence of the group to which the application belongs, but also related to an order of the application in the group. A sequence of the applications in the group may be determined according to intra-group information of the group. The intra-group information may include use frequency of an application, whether an application is a newly installed application, an initial of a name of an application, and the like. For example, the use frequency of the applications in the group is sorted in descending order. If two applications have the same use frequency, or use frequency of two applications is not obtained (for example, the use frequency of the two application is 0), the two applications are sorted according to initials of names of the applications.

If the target application includes a plurality of applications, application icons of different sizes are displayed for applications at different sorting positions. For example, the target applications include a first sub-application and a second sub-application. The first sub-application is sorted before the second sub-application in a second group, and the first sub-application includes N applications, where N is a positive integer. The second group is any one of the plurality of groups. An icon size of the first sub-application displayed in a display region of the second group is greater than an icon size of the second sub-application displayed in the display region.

Figure 2B:
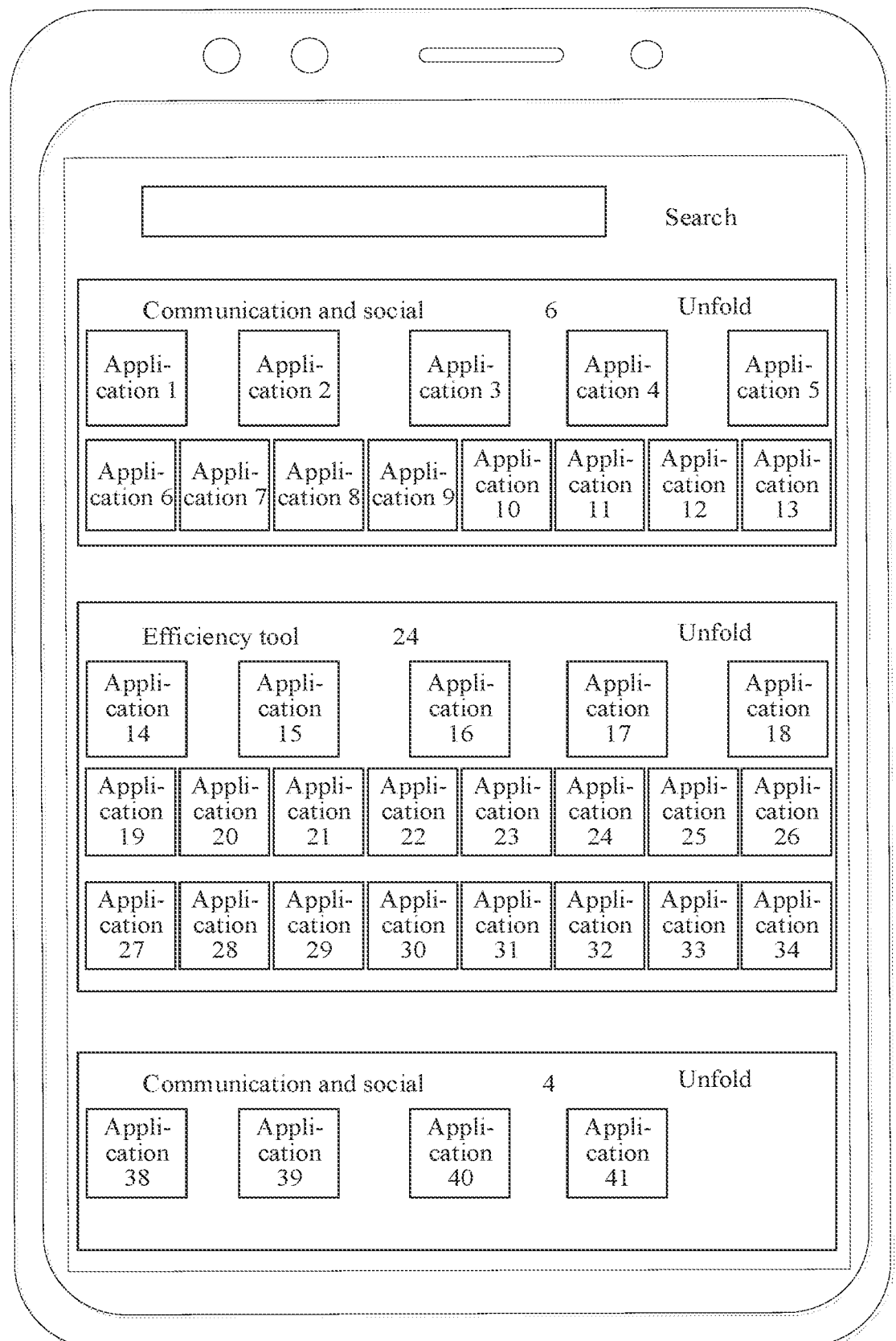

N may be set according to an actual situation. For example, as shown in FIG. 2b, N is 5, that is, application icons of five applications (that is, the first row) sorted first in the target applications are displayed as large icons, and application icons of applications (that is, the second row, the third row, and the like) sorted after the five applications in the target applications are displayed as small icons.

Based on the above, if a number of applications included in the group is greater than a number of target applications, some applications in the group may not be displayed on the desktop. In this case, the group may be displayed in a folded manner, for example, a folding control is displayed in the display region of the group, and the application icons of the applications in the target applications are displayed. In other words, after the displaying an application icon of a target application included in the plurality of groups on a desktop of the electronic device according to the group display sequence and an icon display sequence of each group in response to the first input, the method further includes the following steps:

displaying a folding control in a display region of a third group in a case that a total number of applications in the third group is greater than a number of applications included in target applications of the third group, where the third group is any one of the plurality of groups;

receiving a second input for the folding control; and displaying application icons of the applications included in the third group according to a display sequence of the applications included in the third group in response to the second input, where the display sequence of the applications included in the third group is determined according to use frequency of the applications included in the third group.

Specifically, the second input may be an input of tapping or sliding the folding control, and is not limited herein. If the applications in the third group cannot be completely displayed, the applications included in the third group need to be displayed in a folded manner. The target applications of the third group are displayed on the desktop, and the folding control is displayed. The user may tap the folding control, to display the applications included in the third group in an unfolded manner. The display sequence of the applications in the third group may be determined according to the use frequency of the applications. When switching between an unfolded state and a folded state, the desktop transitions smoothly through high-frame-rate animation.

The display sequence of the applications in the third group is determined according to the use frequency of the applications. If the use frequency is the same, the sequence may be determined according to initials of names of the applications.

In a case that the third group is unfolded, a group adjacent to the third group is displayed in the folded manner. By default, the groups are displayed in the folded manner.

Long-press dragging is supported whether the group is in the folded state or the unfolded state. After long pressing, a hand-following icon is displayed as a large icon. When the group is in the folded state, the application icon of the target application is displayed.

Figure 2C:
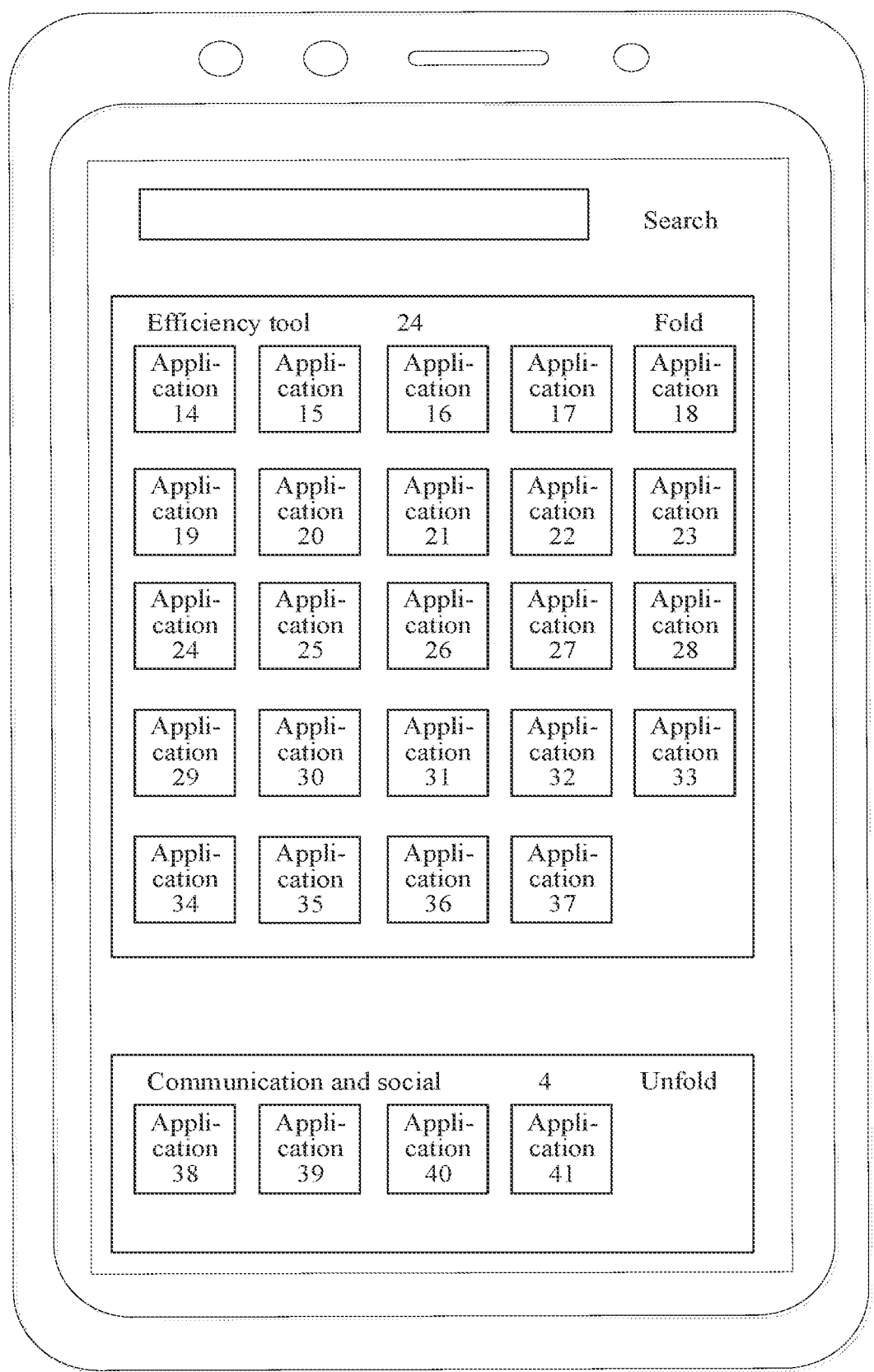

In FIG. 2b, an "Unfold" mark is displayed in the display region of the group, which indicates that the group is in the folded state, and a number near a group name indicates a number of applications included in the group. As shown in FIG. 2c, when an efficiency tool group is displayed in the unfolded manner, application icons of all applications in the group are displayed as large icons, and a "Fold" mark is displayed in the display region of the group, which indicates that the group is in the unfolded state.

Further, in a case that a first group includes a newly installed application, an icon of the newly installed application is displayed at the top of the first group, where the first group is any one of the plurality of groups. For example, the newly installed application is displayed at a first place of the sequence of the application icons in the group. The first group is any one of the plurality of groups. The newly installed application may be an application whose installation time to current time does not exceed preset time, and the preset time may be set according to an actual situation, for example, 24 hours. When the newly installed application is displayed at the top, the user may dynamically adjust time of display of the newly installed application at the top, for example, 12 hours. After the time of display at the top expires, the newly installed application is sorted according to use frequency in subsequent sorting. When there are a plurality of newly installed applications, a sequence of the plurality of newly installed application is determined according to installation time of the applications by default.

Based on the above, the applications are displayed according to categories. This helps the user to search for a fuzzy-memorized application according to the category. The category is based on frequency, which also ensures efficiency of the user to search for a commonly used application. Each group of applications are arranged in a manner of large icons and small icons, ensuring that in a limited display region, more visible applications are displayed, which is convenient for the user to search for an application without unfolding the group in more use scenarios. When all the groups are in the folded state, even though many applications are installed in the electronic device, a length of a whole list is controllable, avoiding that the list is too long and causes the user to miss an icon when sliding the list. The transition animation of switching between the unfolded state and the folded state is visually fresh and impactful. The sorting manner in this application ensures efficiency of searching for applications of medium and low-frequency in a case that a large number of applications are installed in the electronic device.

It should be noted that the application icon display method provided in the embodiments of this application may be performed by an application icon display apparatus, or a control module configured to perform an application arrangement method in the application icon display apparatus. An application arrangement apparatus provided in an embodiment of this application is described by using an example in which the application icon display apparatus performs the application arrangement method in this embodiment of this application.

Figure 3:
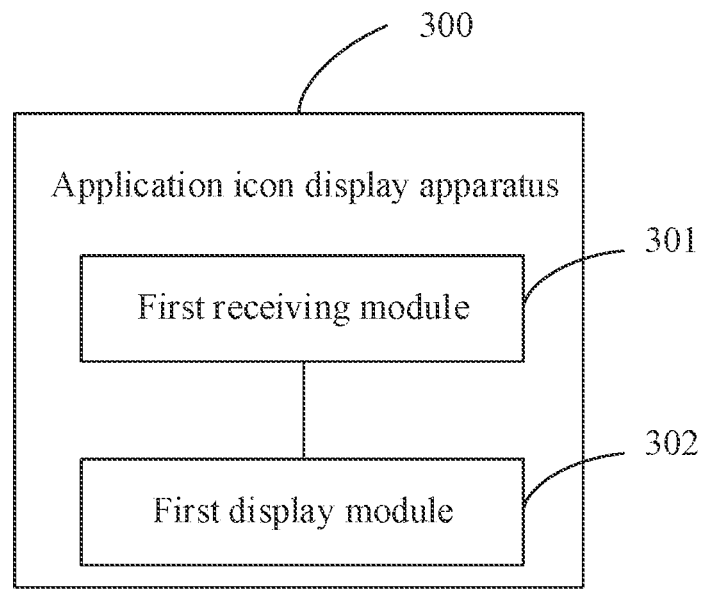
FIG. 3 is a structural diagram of an application icon display apparatus according to an embodiment of this application.

As shown in FIG. 3, an application icon display apparatus 300 provided in this embodiment of this application includes:
- a first receiving module 301, configured to receive a first input; and
- a first display module 302, configured to display application icons of applications included in a plurality of groups in response to the first input, where the plurality of groups are obtained by classifying a plurality of applications installed in an electronic device, and each group includes at least one application.

Further, each of the plurality of groups has a group display sequence; and the group display sequence is determined according to a sum of use frequency of all applications in each group in descending order.

Further, the first display module 302 is configured to display application icons of target applications included in the plurality of groups on a desktop of the electronic device according to the group display sequence and an icon display sequence of each group in response to the first input, where the icon display sequence is determined according to intra-group information of the group.

Further, in a case that a first group includes a newly installed application, an icon of the newly installed application is displayed at the top of the first group, where the first group is any one of the plurality of groups.

Further, the target applications include a first sub-application and a second sub-application, the first sub-application is sorted before the second sub-application in a second group, the first sub-application includes N applications, and N is a positive integer, where the second group is any one of the plurality of groups; and An icon size of the first sub-application displayed in a display region of the second group is greater than an icon size of the second sub-application displayed in the display region. Further, the application icon display apparatus 300 further includes:
- a second display module, configured to display a folding control in a display region of a third group in a case that a total number of applications in the third group is greater than a number of applications included in target applications of the third group, where the third group is any one of the plurality of groups;
  - a second receiving module, configured to receive a second input for the folding control; and
  - a third display module, configured to display application icons of the applications included in the third group according to a display sequence of the applications included in the third group in response to the second input, where the display sequence of the applications included in the third group is determined according to use frequency of the applications included in the third group.

The application icon display apparatus 300 provided in this embodiment of this application can implement processes implemented in the method embodiment of FIG. 1, and the same technical effects can be achieved. To avoid repetition, details are not described herein again.

The application icon display apparatus 300 may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, a personal digital assistant (PDA), or the like, and the non-mobile electronic device may be a server, a network attached storage (NAS), a personal computer (PC), a television, a teller machine, an automated machine, or the like, which are not specifically limited in this embodiment of this application.

The application icon display apparatus 300 in this embodiment of this application may be an apparatus having an operating system. The operating system may be an Android (Android) operating system, may be an ios operating system, or may be another possible operating system, which is not specifically limited in this embodiment of this application.

Figure 4:
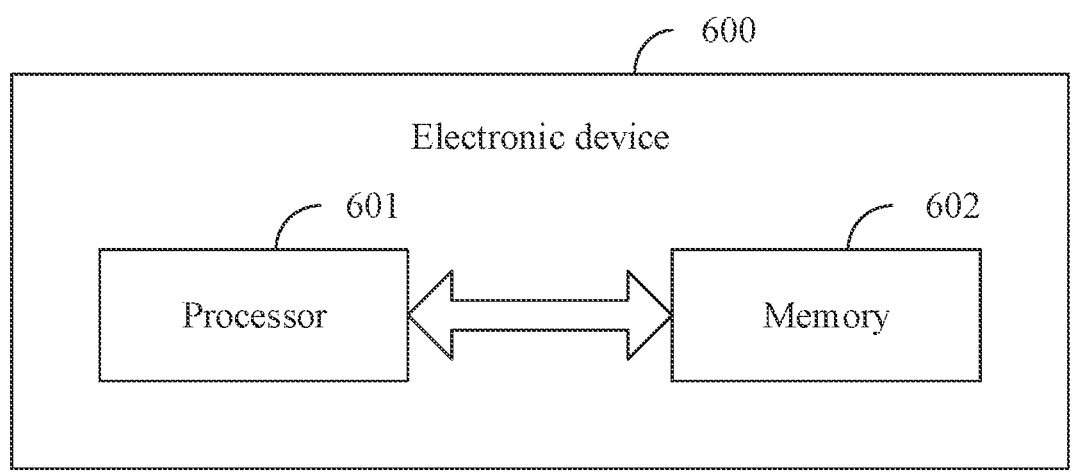
FIG. 4 is a structural diagram of an electronic device according to an embodiment of this application.

Optionally, as shown in FIG. 4, an embodiment of this application further provides an electronic device 600, including a processor 601, a memory 602, and a program or instructions stored in the memory 602 and executable on the processor 601. The program or the instructions, when executed by the processor 601, implement processes of the embodiments of the application icon display method, and the same technical effect can be achieved. To avoid repetition, details are not described herein again.

It should be noted that the electronic device in this embodiment of this application includes the foregoing mobile electronic device and non-mobile electronic device.

Figure 5:
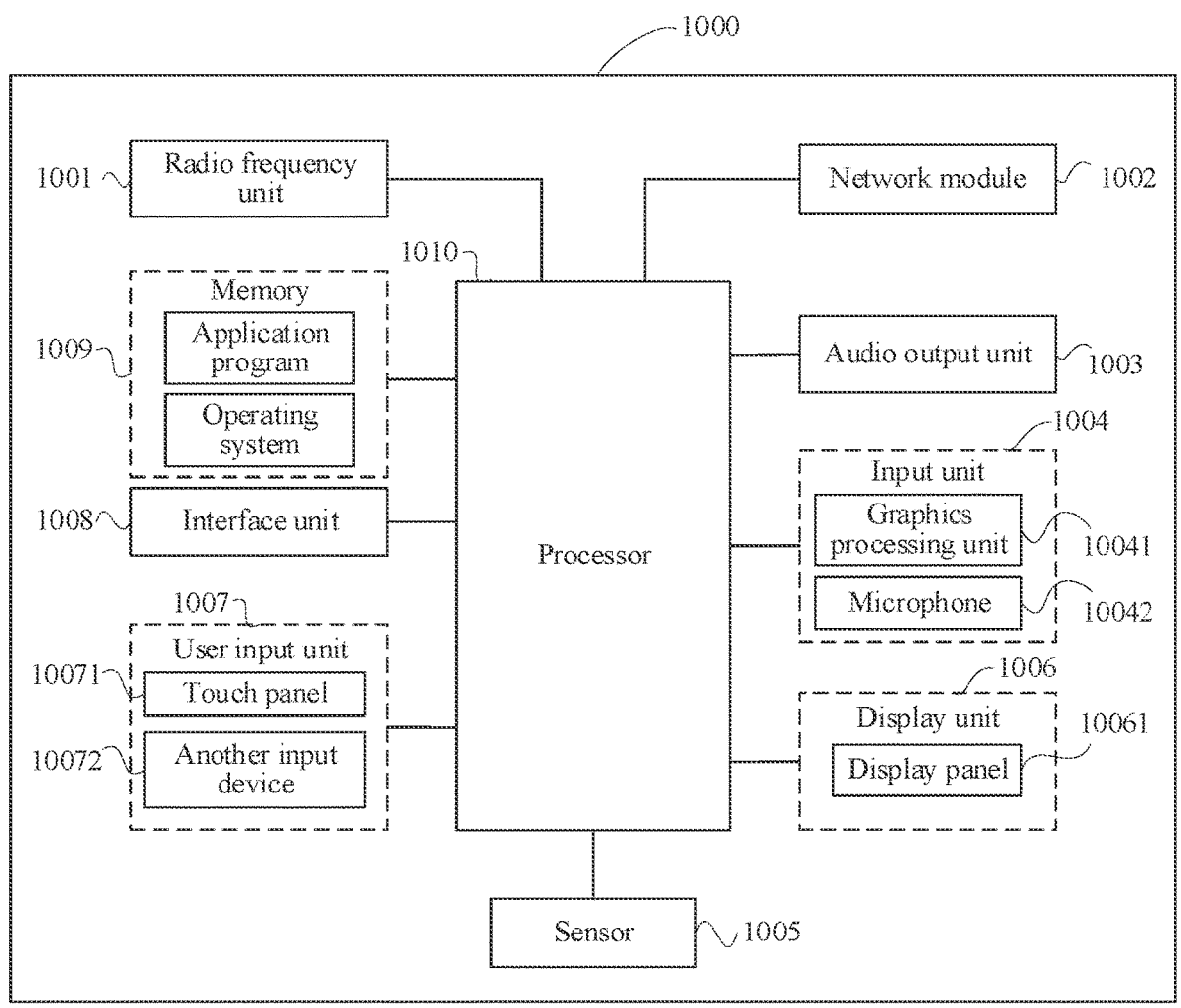
FIG. 5 is a schematic diagram of a hardware structure of an electronic device according to an embodiment of this application.

FIG. 5 is a schematic diagram of a hardware structure of an electronic device implementing the embodiments of this application.

The electronic device 1000 includes, but is not limited to, components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the electronic device 1000 may further include a power supply (such as a battery) for supplying power to the components. The power supply may be logically connected to the processor 1010 by using a power management system, thereby implementing functions, such as charging, discharging, and power consumption management, by using the power management system. The structure of the electronic device shown in FIG. 5 constitutes no limitation on the electronic device, and the electronic device may include more or fewer components than those shown in the figure, or some components may be combined, or a different component deployment may be used, which is not described herein again.

The input unit 1004 is configured to receive a first input.
The display unit 1006 is configured to display application icons of applications included in a plurality of groups in response to the first input, where the plurality of groups are obtained by classifying a plurality of applications installed in an electronic device, and each group includes at least one application.

Further, each of the plurality of groups has a group display sequence.

The group display sequence is determined according to a sum of use frequency of all applications in each group in descending order.

Further, the display unit 1006 is further configured to display application icons of target applications included in the plurality of groups on a desktop of the electronic device according to the group display sequence and an icon display sequence of each group in response to the first input, where the icon display sequence is determined according to intra-group information of the group.

Further, in a case that a first group includes a newly installed application, an icon of the newly installed application is displayed at the top of the first group, where the first group is any one of the plurality of groups.

Further, the target applications include a first sub-application and a second sub-application, the first sub-application is sorted before the second sub-application in a second group, the first sub-application includes N applications, and N is a positive integer, where the second group is any one of the plurality of groups.

An icon size of the first sub-application displayed in a display region of the second group is greater than an icon size of the second sub-application displayed in the display region.

Further, the display unit 1006 is further configured to display a folding control in a display region of a third group in a case that a total number of applications in the third group is greater than a number of applications included in target applications of the third group, where the third group is any one of the plurality of groups.

The input unit 1004 is configured to receive a second input for the folding control.

The display module 1006 is further configured to display application icons of the applications included in the third group according to a display sequence of the applications included in the third group in response to the second input, where the display sequence of the applications included in the third group is determined according to use frequency of the applications included in the third group.

It should be noted that in this embodiment of this application, the input unit 1004 may include a graphics processing unit (GPU) 10041 and a microphone 10042. The graphics processing unit 10041 performs processing on image data of a static picture or a video that is obtained by an image acquisition device (for example, a camera) in a video acquisition mode or an image acquisition mode. The display unit 1006 may include a display panel 10061, and the display panel 10061 may be configured by using a liquid crystal display, an organic light-emitting diode, or the like. The user input unit 1007 includes a touch panel 10071 and another input device 10072. The touch panel 10071 is also referred to as a touch screen. The touch panel 10071 may include two parts: a touch detection apparatus and a touch controller. The another input device 10072 may include, but is not limited to, a physical keyboard, a functional key (such as a volume control key or a switch key), a track ball, a mouse, and a joystick, which are not described herein again. The memory 1009 may be configured to store a software program and various data, which includes, but is not limited to, an application program and an operating system. The processor 1010 may integrate an application processor and a modem. The application processor mainly processes an operating system, a user interface, an application program, and the like. The modem mainly processes wireless communication. It may be understood that, the modem may alternatively not be integrated in the processor 1010.

An embodiment of this application further provides a readable storage medium. The readable storage medium stores a program or instructions, the program or the instructions, when executed by a processor, implementing processes of the embodiments of the application icon display method, and the same technical effects can be achieved. To avoid repetition, details are not described herein again.

The processor is the processor in the electronic device in the foregoing embodiment. The readable storage medium includes a computer-readable storage medium, such as a computer read-only memory (ROM), a random access memory (RAM), a magnetic disk, an optical disc, or the like.

An embodiment of this application further provides a chip. The chip includes a processor and a communication interface. The communication interface is coupled to the processor. The processor is configured to execute a program or instructions, to implement processes of embodiments of the application icon display method, and the same technical effects can be achieved. To avoid repetition, details are not described herein again.

It should be understood that the chip provided in this embodiment of this application may also be referred to as a system-level chip, a system chip, a chip system, a system on chip, or the like.

It should be noted that terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the embodiments of this application is not limited to performing the functions in the order shown or discussed, but may also include performing the functions in a substantially simultaneous manner or in reverse order according to the functions involved, for example, the described method may be performed in a different order than described, and various steps may be added, omitted, or combined. In addition, features described with reference to some examples may be combined in other examples.

Through the descriptions of the foregoing implementations, a person skilled in the art may clearly understand that the method in the foregoing embodiments may be implemented by using software and a necessary general hardware platform, and certainly, may alternatively be implemented by hardware, but in many cases, the former manner is a better implementation. Based on such an understanding, the technical solutions of this application essentially or the part contributing to the related art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, a network device, or the like) to perform the methods described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An application icon display method, comprising:
receiving a first input;
displaying application icons of applications comprised in a plurality of groups in response to the first input, wherein the plurality of groups are obtained by classifying a plurality of applications installed in an electronic device, and each group comprises at least one application;
displaying a folding control in a display region of a third group in a case that a total number of applications in the third group is greater than a number of applications comprised in target applications of the third group, wherein the third group is any one of the plurality of groups;
receiving a second input for the folding control; and
displaying application icons of the applications comprised in the third group according to a display sequence of the applications comprised in the third group in response to the second input, wherein the display sequence of the applications comprised in the third group is determined according to use frequency of the applications comprised in the third group.

2. The application icon display method according to claim 1, wherein each of the plurality of groups has a group display sequence; and
the group display sequence is determined according to a sum of use frequency of all applications in each group in descending order.

3. The application icon display method according to claim 2, wherein the displaying application icons of applications comprised in a plurality of groups in response to the first input comprises:
displaying application icons of target applications comprised in the plurality of groups on a desktop of the electronic device according to the group display sequence and an icon display sequence of each group in response to the first input, wherein the icon display sequence is determined according to intra-group information of the group.

4. The application icon display method according to claim 3, wherein in a case that a first group comprises a newly installed application, an icon of the newly installed application is displayed at the top of the first group, wherein the first group is any one of the plurality of groups.

5. The application icon display method according to claim 3, wherein the target applications comprise a first sub-application and a second sub-application, the first sub-application is sorted before the second sub-application in a second group, the first sub-application comprises N applications, and N is a positive integer, wherein the second group is any one of the plurality of groups; and
an icon size of the first sub-application displayed in a display region of the second group is greater than an icon size of the second sub-application displayed in the display region.

6. An electronic device, comprising a processor, a memory, and a program or instructions stored in the memory and executable on the processor, wherein the program or instructions, when executed by the processor, causes the electronic device to perform:
receiving a first input;
displaying application icons of applications comprised in a plurality of groups in response to the first input, wherein the plurality of groups are obtained by classifying a plurality of applications installed in an electronic device, and each group comprises at least one application;
displaying a folding control in a display region of a third group in a case that a total number of applications in the third group is greater than a number of applications comprised in target applications of the third group, wherein the third group is any one of the plurality of groups;
receiving a second input for the folding control; and
displaying application icons of the applications comprised in the third group according to a display sequence of the applications comprised in the third group in response to the second input, wherein the display sequence of the applications comprised in the third group is determined according to use frequency of the applications comprised in the third group.

7. The electronic device according to claim 6, wherein each of the plurality of groups has a group display sequence; and
the group display sequence is determined according to a sum of use frequency of all applications in each group in descending order.

8. The electronic device according to claim 7, wherein when displaying application icons of applications comprised in a plurality of groups in response to the first input, the program or the instructions, when executed by the processor, causes the electronic device to perform:
displaying application icons of target applications comprised in the plurality of groups on a desktop of the electronic device according to the group display sequence and an icon display sequence of each group in response to the first input, wherein the icon display sequence is determined according to intra-group information of the group.

9. The electronic device according to claim 8, wherein the program or the instructions, when executed by the processor, causes the electronic device to perform:
in a case that a first group comprises a newly installed application, an icon of the newly installed application is displayed at the top of the first group, wherein the first group is any one of the plurality of groups.

10. The electronic device according to claim 8, wherein the target applications comprise a first sub-application and a second sub-application, the first sub-application is sorted before the second sub-application in a second group, the first sub-application comprises N applications, and N is a positive integer, wherein the second group is any one of the plurality of groups; and
an icon size of the first sub-application displayed in a display region of the second group is greater than an icon size of the second sub-application displayed in the display region.

11. A non-transitory readable storage medium, storing a program or instructions, wherein the program or the instructions, when executed by a processor, causes the processor to perform:
receiving a first input;
displaying application icons of applications comprised in a plurality of groups in response to the first input, wherein the plurality of groups are obtained by classifying a plurality of applications installed in an electronic device, and each group comprises at least one application;

displaying a folding control in a display region of a third group in a case that a total number of applications in the third group is greater than a number of applications comprised in target applications of the third group, wherein the third group is any one of the plurality of groups;

receiving a second input for the folding control; and displaying application icons of the applications comprised in the third group according to a display sequence of the applications comprised in the third group in response to the second input, wherein the display sequence of the applications comprised in the third group is determined according to use frequency of the applications comprised in the third group.

12. The non-transitory readable storage medium according to claim 11, wherein each of the plurality of groups has a group display sequence; and the group display sequence is determined according to a sum of use frequency of all applications in each group in descending order.

13. The non-transitory readable storage medium according to claim 12, wherein when displaying application icons of applications comprised in a plurality of groups in response to the first input, the program or the instructions, when executed by the processor, causes the processor to perform:

displaying application icons of target applications comprised in the plurality of groups on a desktop of the electronic device according to the group display sequence and an icon display sequence of each group in response to the first input, wherein the icon display sequence is determined according to intra-group information of the group.

14. The non-transitory readable storage medium according to claim 13, wherein the program or the instructions, when executed by the processor, causes the processor to perform:

in a case that a first group comprises a newly installed application, an icon of the newly installed application is displayed at the top of the first group, wherein the first group is any one of the plurality of groups.

15. The non-transitory readable storage medium according to claim 13, wherein the target applications comprise a first sub-application and a second sub-application, the first sub-application is sorted before the second sub-application in a second group, the first sub-application comprises N applications, and N is a positive integer, wherein the second group is any one of the plurality of groups; and an icon size of the first sub-application displayed in a display region of the second group is greater than an icon size of the second sub-application displayed in the display region.

16. A chip, comprising a processor and a communication interface, wherein the communication interface is coupled to the processor, and the processor is configured to execute a program or instructions, to implement steps of the application icon display method according to claim 1.

17. A computer program product, wherein the program product is stored in a non-volatile storage medium, and the program product is executed by at least one processor, to implement steps of the application icon display method according to claim 1.

* * * * *